United States Patent Office 2,885,281
Patented May 5, 1959

2,885,281

METHOD OF PRODUCING HAFNIUM-FREE "CRYSTAL-BAR" ZIRCONIUM FROM A CRUDE SOURCE OF ZIRCONIUM

Ivan Edgar Newnham, North Balwyn, Victoria, Australia, assignor, by mesne assignments, to Mallory-Sharon Metals Corporation, a corporation of Delaware No Drawing. Application November 22, 1955
Serial No. 548,547

Claims priority, application Australia November 22, 1954

4 Claims. (Cl. 75—84.4)

This invention relates to an improved method of producing hafnium-free "crystal-bar" zirconium from a crude source of zirconium.

This application is a continuation-in-part of pending application Serial No. 360,320, filed June 8, 1953, now Patent No. 2,791,485, granted May 7, 1957.

At the present time, ductile "crystal-bar" zirconium is prepared from "sponge" zirconium by a process involving the formation, and subsequent decomposition, of zirconium iodide. In the known process, zircon sand is heated with carbon to produce a carbide which is chlorinated to produce zirconium chloride. The latter is then reduced by a suitable reducing agent such as magnesium in order to form the "sponge" zirconium. Zircon sand normally contains impurities such as hafnium, aluminium, iron and vanadium and it is therefore also necessary to include additional steps in the process in order to remove these impurities. The normal procedure for producing pure "crystal-bar" zirconium is thus of an involved nature and this is especially so when the additional steps are included to eliminate hafnium and other impurities.

The main objective of this invention is to provide an improved process for the production of "crystal-bar" zirconium from a crude zirconium source whereby the number of steps in the process is reduced thereby effecting a considerable reduction in the cost of producing pure "crystal-bar" zirconium.

Other objects and advantages of the invention will be apparent from the following description, to those skilled in the art.

In accordance with the invention, a method of producing hafnium-free "crystal-bar" zirconium from a crude source of zirconium comprises the steps of treating the crude source so as to convert the zirconium therein into the tetraiodide form, reducing the tetraiodide of zirconium to the trihalide form, separating any unreduced iodides of zirconium and other metal impurities from the reduced iodides of zirconium and other metal impurities, separating the reduced iodide of zirconium from the other reduced iodides by heating the mixture of reduced iodides in order to disproportionate the reduced iodide of zirconium and reform the tetraiodide thereof, and finally decomposing the tetraiodide thus formed to produce "crystal-bar" zirconium. Essentially, therefore, the method comprises the conversion of zirconium carbide to zirconium iodide which is then purified and subsequently decomposed to form "crystal-bar" zirconium.

To enable a fuller practical appreciation of the invention, we shall now describe, by way of example, a process in accordance therewith whereby "crystal-bar" zirconium is produced from zircon sand containing hafnium, aluminium, titanium, iron and vanadium impurities.

According to this process, crude carbide is first formed by heating zircon sand with carbon in a graphite resistor furnace or arc furnace in known manner. Conversion of the carbide to iodide is then carried out by heating the carbide in a stream of iodine in known manner to form zirconium tetraiodide.

The iodides of zirconium and of the metal impurities prepared as described above can be conveniently collected on the cooled coils of a removable lid or on some other condenser member of a reaction vessel or, alternatively, they may be resublimed on to such a condenser prior to the next stage in the process. The lid or other condenser member carrying the zirconium tetraiodide and the iodides of the impurities is then transferred to another reaction vessel containing powdered zirconium. The vessel is evacuated and heated to 500° C. at which temperature the zirconium tetraiodide sublimes and reacts in the bottom of the vessel with the powdered zirconium metal to form the relatively involatile triiodide. At the same time as the zirconium tetraiodide is reduced, the iodides of iron and vanadium will also be reduced to relatively involatile lower iodide forms and these will collect in the bottom of the chamber, together with the zirconium triiodide and any remaining zirconium metal. The vessel is then allowed to cool and any unreduced iodides will collect on the condenser coils of the removable lid or the like. In this case, it is found that the iodides of aluminium and hafnium are not reduced and will condense on the condenser coils. In this way, hafnium and aluminium impurities are separated from the zirconium. From 50 to 70% of the titanium iodide also condenses on the coils and the remainder is reduced to relatively involatile titanium diiodide by the powdered zirconium metal in the bottom of the vessel.

The lid or other condenser member on which the unreduced iodides of hafnium, aluminium and titanium have collected is then replaced by a new condenser member and once again the vessel is evacuated and heated to 350° C. During this second heating stage, the zirconium triiodide disproportionates in accordance with the formula:

$$2ZrI_3 \rightarrow ZrI_4 + ZrI_2$$

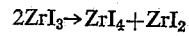

and pure zirconium tetraiodide will be condensed on the coils of the condenser which are kept cool during the heating of the vessel in this stage of the process. The residue in the vessel consists of the reduced iodides of titanium, iron and vanadium together with a mixture of zirconium and zirconium diiodide, and is used as the reducing agent for the next batch of impure iodide in place of the powdered zirconium referred to above as the reducing agent used at the commencement of the process.

The lid or other condenser on which the pure zirconium tetraiodide has been collected is then removed from the vessel and the iodide obtained therefrom is passed over a heated zirconium wire in known manner in order to decompose the iodide and form "crystal-bar" zirconium.

The process in accordance with the invention thus enables hafnium-free "crystal-bar" zirconium to be produced from a crude zirconium source by the direct conversion of carbide to iodide and thereby eliminates several steps from the known procedure. The reduction step in the process in which the higher iodides are reduced to lower iodides enables hafnium, aluminium and other metals, the iodides of which are not reduced by zirconium metal or other reducing agent used in the process, to be separated while the subsequent heating step in the process in which the reduced iodide of zirconium disproportionates, enables other impurities such as iron and vanadium, the iodides of which are reduced when the reduction of zirconium tetraiodide to zirconium triiodide takes place, to be removed. Titanium, and other metals which form lower iodides with disproportionation temperatures close to that of zirconium triiodide, can be partly removed on the coils as volatile iodides and partly collected at the bottom of the vessel as comparatively involatile lower iodides. It is possible to retain any reduced titanium iodide in the involatile residue by making use of the fact that, although zirconium triiodide is disproportionated at temperatures above 310° C., titanium triiodide does not commence to disproportionate until the temperature exceeds 350° C.

It will thus be apparent that the process in accordance with the instant invention will be instrumental in effecting a substantial advance in the art and will bring about a considerable reduction in the cost of producing hafnium-free "crystal-bar" zirconium.

I claim:

1. A method of producing hafnium-free "crystal-bar" zirconium from a crude source of zirconium comprising the steps of treating the crude source so as to convert the zirconium therein into the tetraiodide form, reducing the tetraiodide of zirconium to the trihalide form, separating unreduced iodides of zirconium and other unreduced iodides of metal impurities from the reduced iodides of zirconium and other reduced iodides of metal impurities, separating the reduced iodide of zirconum from the other reduced iodides by heating the mixture of reduced iodides in order to disproportionate the reduced iodide of zirconium and reform the tetraiodide thereof, and finally decomposing the tetraiodide thus formed to produce hafnium-free "crystal-bar" zirconium.

2. A method of producing hafnium-free "crystal-bar" zirconium from a crude source of zirconium containing hafnium, aluminium, titanium, iron and vanadium impurities comprising the steps of treating the crude source so as to convert the zirconium therein into the tetraiodide form, reducing the tetraiodide of zirconium to the trihalide form, separating unreduced iodides of zirconium, aluminium, hafnium and titanium from the reduced iodides of zirconium, iron, vanadium and titanium, heating the reduced iodides to disproportionate the reduced iodide of zirconium and reform the tetraiodide thereof, separating the reformed tetraiodide of zirconium from the residue comprising the reduced iodides of zirconium, iron, vanadium and titanium, and finally decomposing the tetraiodide thus formed to produce hafnium-free "crystal-bar" zirconium.

3. A method of producing hafnium-free "crystal-bar" zirconium from zircon sand containing hafnium, aluminium, titanium, iron and vanadium impurities comprising the steps of heating the sand with carbon to produce crude carbide, heating the crude carbide in a stream of iodine to convert the zirconium into the tetrahalide form, heating the tetrahalide in vacuo at a temperature of about 500° C. in the presence of a reducing agent to convert the zirconium to the trihalide form and reduce the iron and vanadium and a proportion of the titanium to relatively involatile lower iodide forms, separating unreduced iodides of zirconium, aluminium, hafnium and titanium from the reduced iodides of zirconium, iron, vanadium and titanium, heating the reduced iodides in vacuo at a temperature of about 350° C. to disproportionate the reduced iodide of zirconium and reform the tetraiodide thereof, condensing the reformed tetraiodide and separating it from the residue comprising the reduced iodides of zirconium, iron, vanadium and titanium, and finally decomposing the reformed zirconium tetraiodide to form hafnium-free "crystal-bar" zirconium.

4. A method of producing hafnium-free "crystal-bar" zirconium from a crude source of zirconium comprising the steps of treating the crude source so as to convert the zirconium therein into the tetraiodide form, reducing the tetraiodide of zirconium to the trihalide form by means of a reducing agent, separating unreduced iodides of zirconium and other unreduced iodides of metal impurities which are not reduced to lower halide forms by the reducing agent from the reduced halides of zirconium and other reduced iodides of metal impurities which are reduced to lower halide forms by the reducing agent, heating the reduced iodides to disproportionate the reduced iodide of zirconium and reform the tetraiodide thereof, separating the reformed tetraiodide of zirconium from the reduced halides of zirconium and the metal impurities which have been reduced to lower halide forms by the reducing agent, and finally decomposing the tetraiodide thus formed to produce hafnium-free "crystal-bar" zirconium.

References Cited in the file of this patent

UNITED STATES PATENTS

| 2,670,270 | Jordan | Feb. 23, 1954 |
| 2,714,564 | Loonam | Aug. 2, 1955 |

FOREIGN PATENTS

| 660,397 | Great Britain | Nov. 7, 1951 |
| 698,235 | Great Britain | Oct. 14, 1953 |
| 722,901 | Great Britain | Feb. 2, 1955 |

OTHER REFERENCES

Steel, vol. 127, No. 4, July 24, 1950, pages 63–65.